(12) United States Patent
Jakob et al.

(10) Patent No.: US 12,367,129 B2
(45) Date of Patent: Jul. 22, 2025

(54) AUTOMATED TESTING OF USER INTERFACES REQUIRING A TIME-BASED ONE-TIME PASSWORD (TOTP)

(71) Applicant: MICRO FOCUS LLC, Santa Clara, CA (US)

(72) Inventors: Eyal Jakob, Cumming, GA (US); Constantine Adarchenko, Alpharetta, GA (US); Vladyslav Voloshyn, Cumming, GA (US)

(73) Assignee: Micro Focus LLC, Santa Clara, CA (US)

(*) Notice: Subject to any disclaimer, the term of this patent is extended or adjusted under 35 U.S.C. 154(b) by 53 days.

(21) Appl. No.: 18/130,774

(22) Filed: Apr. 4, 2023

(65) Prior Publication Data

US 2024/0338308 A1 Oct. 10, 2024

(51) Int. Cl.
 *G06F 11/3668* (2025.01)
 *H04L 9/08* (2006.01)

(52) U.S. Cl.
 CPC .......... *G06F 11/3688* (2013.01); *H04L 9/085* (2013.01); *H04L 9/0863* (2013.01)

(58) Field of Classification Search
 CPC ..... G06F 11/3688; H04L 9/085; H04L 9/0863
 See application file for complete search history.

(56) References Cited

U.S. PATENT DOCUMENTS

| | | | | |
|---|---|---|---|---|
| 2021/0256100 | A1* | 8/2021 | Grover | G06V 40/1376 |
| 2021/0258302 | A1* | 8/2021 | Ashraf | H04L 63/0815 |
| 2023/0081622 | A1* | 3/2023 | Schmidt | G06F 21/31 |
| | | | | 717/124 |
| 2024/0143723 | A1* | 5/2024 | Viswanathan | H04L 9/3228 |
| 2024/0205222 | A1* | 6/2024 | Guionneau | H04L 63/0884 |
| 2024/0210907 | A1* | 6/2024 | Malayanur | H04L 63/0272 |

OTHER PUBLICATIONS

Udara, Can we automate a login with two factor authentication? (Aug. 28, 2021) retrieved from https://medium.com/@udarasembukut-tiarachchi/can-we-automate-a-login-with-two-factor-authentication-1eb28ee5d729 on Sep. 28, 2024 (Year: 2021).*
M'Raihi et al. "TOTP: Time-Based One-Time Password Algorithm," IETF, May 2021, RFC 6238, 16 pages.

\* cited by examiner

*Primary Examiner* — Lewis A Bullock, Jr.
*Assistant Examiner* — Theodore E Hebert
(74) *Attorney, Agent, or Firm* — Sheridan Ross P.C.

(57) ABSTRACT

Automated testing of an application under test (AUT) often requires providing valid responses to an authentication challenge. Many AUTs require a username and password and, increasingly, a time-based one-time password (TOTP) that complicate automated testing. By storing a shared secret on a client device, a human can train an automated testing application to select the shared secret and provide the shared secret to a shared secret provider. The shared secret provider then provides a token code as the TOTP. The shared secret may be stored as a graphical element, such as a quick response (QR) code, and may further correspond to a particular username used to test the AUT.

20 Claims, 6 Drawing Sheets

AUTOMATED TESTING OF USER INTERFACES REQUIRING A TIME-BASED ONE-TIME PASSWORD (TOTP)

FIELD OF THE DISCLOSURE

The invention relates generally to systems and methods for automated testing of an application under test (AUT) and particularly to satisfying an authentication request of the AUT that requires a time-based one-time password (TOTP).

BACKGROUND

Test applications may be used to identify erroneous behavior, faults, vulnerabilities, or other undesired behavior in computer-based applications, including freestanding applications (e.g., executables) and client-side applications, which may be executed inside another application, such as a browser connected to a server via a network. Testing such applications is often highly automated with a test application providing inputs to the application under test (AUT) and obtaining results.

The specific tests may be predetermined or dynamically determined. In dynamic application security testing, automating application login plays a critical role; without it, dynamic application scanning would be incomplete, and the attack surface discovered by a tool would be limited.

While in most cases a username/password would be sufficient, in modern web applications, a two-factor authentication (2FA) mechanism is being used. Time-based one-time password (TOTP) is also known as application-based authentication, software tokens, or soft tokens. TOTP is a form of two-factor authentication. 2FA augments the standard username password login flow, which is defined as the "something you know" or "something you have" factor. The "something you have" may be satisfied by obtaining the TOTP.

2FA often relies on text messages (e.g., SMS) or emails to provide the user with a code to be provided into an application. In contrast, the TOTP is available offline and increases account security when used as a second-factor authentication. Common examples of TOTP are Microsoft Authenticator and Google Authenticator. A user first establishes an account with the TOTP provider, utilizing the authentication methods required by the particular TOTP provider. A TOTP application then provides the user with a time-limited code to be entered as a part of the authentication process for the AUT.

The use of a TOTP provides a user with a key (shared secret) to be entered as a portion of an authentication process, such as RFC 6238 by the Internet Engineering Task Force (IETF), titled "TOTP: Time-Based One-Time Password Algorithm," May 2011, publicly available at rfc-editor.org/rfc/rfc6238 and incorporated herein by reference.

While TOTP-based authentication improves security, it requires an external entity to manage registering a new authenticator account and generating the time-based one-time password for the login process to continue. For that reason, TOTP hinders utilization of fully automating a scan of web applications which require TOTP. Moreover, the complexity increases when scanning an application which uses multiple authenticator accounts with different shared secrets (e.g. multiple accounts that register with the same or different servers).

SUMMARY

Prior to this solution, overcoming TOTP authentication included: 1) manual intervention in which the testing application pops up a message requesting the user to enter the TOTP presented by the user's external device. This solution require the user to monitor the scan and manually enter the TOTP, which is both slow and not sustainable for long runs. 2) External messaging, in which a provider that supplies the TOTP uses a dedicated application programming interface (API). 3) Disabling the two-factor TOTP mechanism for testing purposes on the site backend, which is not always feasible and does not simulate a production-ready website or other web-based application.

The use of an external messaging provider is problematic. First, using an external provider introduces a scan tool (or, more simply, "tool") to a dependency on the messing provider availability. If there are connectivity issues, the tool will fail to execute a TOTP flow. External providers do not provide an on-premises solution. As a result, a user testing an application is required to have external connectivity or the test environment is required to maintain open external ports, which may pose a security risk or may be unavailable due to a testing company's policy prohibiting open ports. Additionally, the external provider might require additional cost or infrastructure to use the service.

These and other needs are addressed by the various embodiments and configurations of the present invention. The present invention can provide a number of advantages depending on the particular configuration. These and other advantages will be apparent from the disclosure of the invention(s) contained herein.

In one embodiment, systems and methods are described for a repository for user accounts and shared secrets instead of relying on an external entity. It should be appreciated that one embodiment of the "external entity" is a TOTP authentication provider that is not operated under the direction of, by, or co-managed with the testing entity (e.g., users of the systems and methods provided herein). In other embodiments, the "external entity," which may or may not have a common corporate affiliation, is nevertheless located externally (e.g., outside a trusted portion of a network, external to a firewall, etc.) to the testing application utilizing the systems and methods provided herein.

Generally, and in another embodiment, a user interface (UI) automation tool is provided to test an AUT and, as a portion thereof, execute two-factor TOTP based authentication steps, synchronized between the UI automation tool and the management system, and extract and parse shared keys from commonly used graphical display components (such as a quick response code (QR code)). Embodiments herein may be provided to support authentication of a single user or multiple users within a single playable script.

In another embodiment, a tester (human or automated) selects a graphical object (or, more simply, an "object") on a display (which may be maintained as a data structure in a memory, such as a "headless" display). The object contains a shared secret which may be encoded as a QR code, an image (e.g., a scalable vector graphic or other image format), or an HTML element that renders a QR code using cascading style sheet (CSS) properties, or other means to present the QR code. While embodiments herein generally utilize QR codes, it should be appreciated that, in other embodiments, the shared secret may be embodied in other graphical codes (e.g., SnapTag, Microsoft Tag, etc.), files, etc. The shared secret (also known as a "key") is extracted from the object and maintained for later playback. As a benefit, multiple objects corresponding to multiple shared secrets may be maintained which, in turn, are each associated with a particular one of multiple users for testing an AUT.

Embodiments are directed, in part, to the UI automation tool and the TOTP provider (the entity providing a TOTP key based on a shared secret related to the web application server). Upon replaying a UI automation script, the UI automation tool will execute a TOTP flow, in which the UI automation tool generates additional evidence (e.g., provides the TOTP key), and only then can the tool continue its next script steps.

Embodiments are generally related to four areas:
1. Shared secret extraction-Reading/scanning the QR code to get the shared secret.
2. Shared secret management-Storing the secret/authenticator name pairs inside an automation solution file.
3. One-time password (OTP) generation-Generating a one-time password (OTP) in accordance with the shared secret and valid for a limited time, such as less than one minute.
4. UI automation-Automatically entering the generated OTP in the correct location in the login sequence.

UI Automation Tool

The UI automation tool records the user's operations and replays the operations during a script run. Basic UI automation script is comprised of user steps, with each step representing a user action. In script development, which is performed when recording a user workflow, a step is generated for each operation the user performs on the web page.

Automating TOTP authentication requires additional steps. The UI automation tool is required to know about the shared secret that both the server and the user have agreed upon. Moreover, in a case of multi-user authentication or multi-layers authentication, the UI automation tool is required to know about multiple shared secrets as well as to map the shared secret to the relevant user account.

In script development, the UI automation tool allows the user to configure multiple accounts and shared secrets. The UI automation tool will use a "Shared Secret Extraction" module to identify and extract shared secrets displayed on the screen and provided by the application server. Once the shared secret is extracted, the UI automation tool uses a "Shared Secret Management" module to store and map the user account to the relevant shared secret.

While recording a user's action, a TOTP challenge workflow is determined. This could be done either by user modification to the script e.g., manually adding additional steps to the script, indicating a TOTP challenge; or by automatically determining a TOTP workflow (e.g., Document Object Model (DOM) inspection/user interface inspection, etc.). In replay, the UI automation will repeat the user operations until reaching the multi-factor authentication section. Since TOTP is time based and requires the shared secret, entering the same input entered while recording the script will fail the execution flow. Once the UI automation tool arrives to the multi-factor authentication section, the shared secret is retrieved and used to generate a time-based one-time token for input. The tool will provide the Shared Secret Management module with user account information (e.g., authentication information such as the user name/account details/hash, etc.) and request the relevant shared secret for the account. Upon shared secret retrieval, the UI automation tool communicates with the OTP generator module and requests a new OTP based on the secret. Once an OTP has been received, the UI automation tool will continue the execution flow and enter the OTP in the relevant element.

Shared Secret Extraction

Generating a time-based one-time password begins with the shared secret that both the server and the authenticator agree upon. In one embodiment, the server generates the shared secret and displays it as plain text or as a QR code to scan. While manual entry of the shared secret is possible, when automated, the server presents the shared secret (QR code), and the UI (via inputs from a human or automated tester) utilizes a pointer (e.g., a mouse) to select a location on the screen displaying the QR code. Once selected, the UI automation tool identifies the elements under the cursor to confirm the object is a QR code. Once identified, the UI automation tool parses the QR code and extracts the shared secret provided by the server for later use by the shared secret management module.

Using the UI automation tool, extracting the shared secret is not limited to user input or the scanning of a QR code. In other embodiments, the shared secret may comprise a file, a reading request response, accessing a specific API to retrieve the secret, etc.

Secret Management

To automate the TOTP authentication process, the UI automation tool is embodied to store shared secrets for script playback. A secret management component is provided that supports multiple authenticator accounts. The secret management component may be integrated as a separate processor service or may be embedded in the UI automation tool. It communicates with the UI automation tool through a dedicated API and acts as a repository for shared secrets, enabling the storage and retrieval of these secrets based on user account information such as nicknames, user details, or hashing. When the tool requests to retrieve a shared secret, a management module verifies the provided information and, if a match is found, the shared secret is returned to the tool. In another embodiment, the shared secret management module serializes the data to enable the shared secret to be stored with the script for successful replay upon loading. This ensures the reconstruction of authenticator information, including user details and shared secrets, for successful script execution.

OTP Generation

The one-time password (OTP) generation component uses a TOTP algorithm which, when given a shared secret, generates the relevant OTP. In various embodiments, the component is a different process/service or is embedded in the UI automation tool. The UI automation tool communicates with the OTP generation component via dedicated API, providing the OTP generation component with the relevant information to generate the OTP. Once the OTP generation component receives a request from the UI automation tool, the OTP generation tool extracts the information from the requests and responds with the time-based OTP.

Multi-User Authentication Workflow

Embodiments provided herein support multi-user authenticator workflow using the shared secret management component to store information of multiple accounts. Additionally or alternatively, parameterization of the user account identifier is provided so that script is ran utilizing requests for different shared secret, for a particular one of a number of users accounts, from the secret management component.

One advantage of certain embodiments disclosed herein, automated testing the AUT, when TOTP authentication is provided, is satisfied without requiring human intervention and without defeating the TOTP authentication (e.g., omitting the TOTP authentication, allowing a token to have a longer or unlimited validity period, allowing any entry to be treated as a valid token entry, etc.).

An automated testing application, such as Micro Focus WebInspect™, may then provide a user-friendly solution by scanning and parsing shared secrets presented by the server and agreed upon by the client. The shared secret may be embodied as a QR code image, or any element rendered as QR code. The QR code may be rendered using a stylesheet and/or an HTML element that, optionally, presents the key as plain text.

The automated testing of the application registers and manages new authenticators (e.g., third-party authenticators, in-house authenticators) and provides for multi-user accounts in a single script, offline playback of login macros without external entities or synchronization queues, and generates TOTP and allow successful replay of TOTP login workflow.

As a result of the embodiments provided herein, the current limitations of TOTP 2FA for security scanners/UI automation tools are mitigated. Implementing such a solution does not require relaying TOTP tokens from an external entity, and the automated testing application may perform all operations and required communications.

Exemplary aspects are directed to:

A computer-implemented method of testing an application under test (AUT), comprising: executing the AUT, comprising an authentication challenge to access a protected portion of the AUT and wherein the authentication challenge requires a token code corresponding to a time-based one-time password (TOTP); executing a test script comprising a number of tests to test the AUT; in response to encountering the authentication challenge, requesting the token code to satisfy the authentication challenge, the requesting comprising requesting a shared secret from a shared secret manager; upon receiving the shared secret from the shared secret manager, providing the shared secret to a TOTP token generator; populating a response field associated with the authentication challenge with the token code received from the TOTP token generator; and executing the test script comprising at least one test of the number of tests to test the protected portion of the AUT.

A system for testing an application under test (AUT), comprising: a processor coupled to a computer memory and having instructions to cause the processor to perform: executing the AUT, comprising an authentication challenge to access a protected portion of the AUT and wherein the authentication challenge requires a token code corresponding to a time-based one-time password (TOTP); executing a test script comprising a number of tests to test the AUT; in response to encountering the authentication challenge, requesting the token code to satisfy the authentication challenge, the requesting comprising requesting a shared secret from a shared secret manager; upon receiving the shared secret from the shared secret manager, providing the shared secret to a TOTP token generator; populating a response field associated with the authentication challenge with the token code received from the TOTP token generator; and executing the test script comprising at least one test of the number of tests to test the protected portion of the AUT.

A system for testing an application under test (AUT), comprising: executing the AUT, comprising an authentication challenge to access a protected portion of the AUT and wherein the authentication challenge requires a token code corresponding to a time-based one-time password (TOTP); in response to encountering the authentication challenge, requesting the token code to satisfy the authentication challenge, the requesting comprising requesting a shared secret wherein the shared secret is selected via an input device input corresponding to a graphical element having the shared secret encoded therein; providing the shared secret to a shared secret extractor for populating a record of shared secrets; performing one or more tests on the AUT; and performing an automated test on the AUT wherein the performing comprises: upon receiving the shared secret from the shared secret manager, providing the shared secret to a TOTP token generator; populating a response field associated with the authentication challenge with the token code received from the TOTP token generator; and executing the test script comprising at least one test of the number of tests to test the protected portion of the AUT.

Any of the above aspects:

Wherein requesting the shared secret further comprises requesting the shared secret corresponding to a username provided to the AUT; and receiving the shared secret from the shared secret manager further comprises receiving the shared secret corresponding to the username.

Wherein providing the shared secret to the TOTP token generator and receiving the token code therefrom further comprises generating the TOTP by the TOTP token generator; and wherein the computer-implemented method further comprises providing at least one of the token code or a key derived from the token code to the AUT as a portion of the authentication challenge Wherein prior to requesting the shared secret from the shared secret manager, providing the shared secret to the shared secret manager comprising accessing the shared secret maintained on a test device executing providing, by the test device, the shared secret to the shared secret manager.

Wherein the shared secret corresponds to a username.

Wherein the graphical element comprises a quick response code (QR code).

Wherein the shared secret maintained on the test device comprises a graphical element having the shared secret encoded therein.

Wherein the graphical element at location of a display generated by the test device and wherein the location is determined from a previously recorded user action selecting the graphical element.

A system on a chip (SoC) including any one or more of the above aspects of the embodiments described herein.

One or more means for performing any one or more of the above aspects of the embodiments described herein.

Any aspect in combination with any one or more other aspects.

Any one or more of the features disclosed herein.

Any one or more of the features as substantially disclosed herein.

Any one or more of the features as substantially disclosed herein in combination with any one or more other features as substantially disclosed herein.

Any one of the aspects/features/embodiments in combination with any one or more other aspects/features/embodiments.

Use of any one or more of the aspects or features as disclosed herein.

Any of the above embodiments or aspects, wherein the data storage comprises a non-transitory storage device, which may further comprise at least one of: an on-chip memory within the processor, a register of the processor, an on-board memory co-located on a processing board with the processor, a memory accessible to the processor via a bus, a magnetic media, an optical media, a solid-state media, an input-output buffer, a memory of an input-output component in communication with the processor, a network communication buffer, and a networked component in communication with the processor via a network interface.

It is to be appreciated that any feature described herein can be claimed in combination with any other feature(s) as described herein, regardless of whether the features come from the same described embodiment.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible, non-transitory medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112 (f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising a numeric reference number, without an alphabetic sub-reference identifier when a sub-reference identifier exists in the figures, when used in the plural, is a reference to any two or more elements with the like reference number. When such a reference is made in the singular form, but without identification of the sub-reference identifier, it is a reference to one of the like numbered elements, but without limitation as to the particular one of the elements being referenced. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
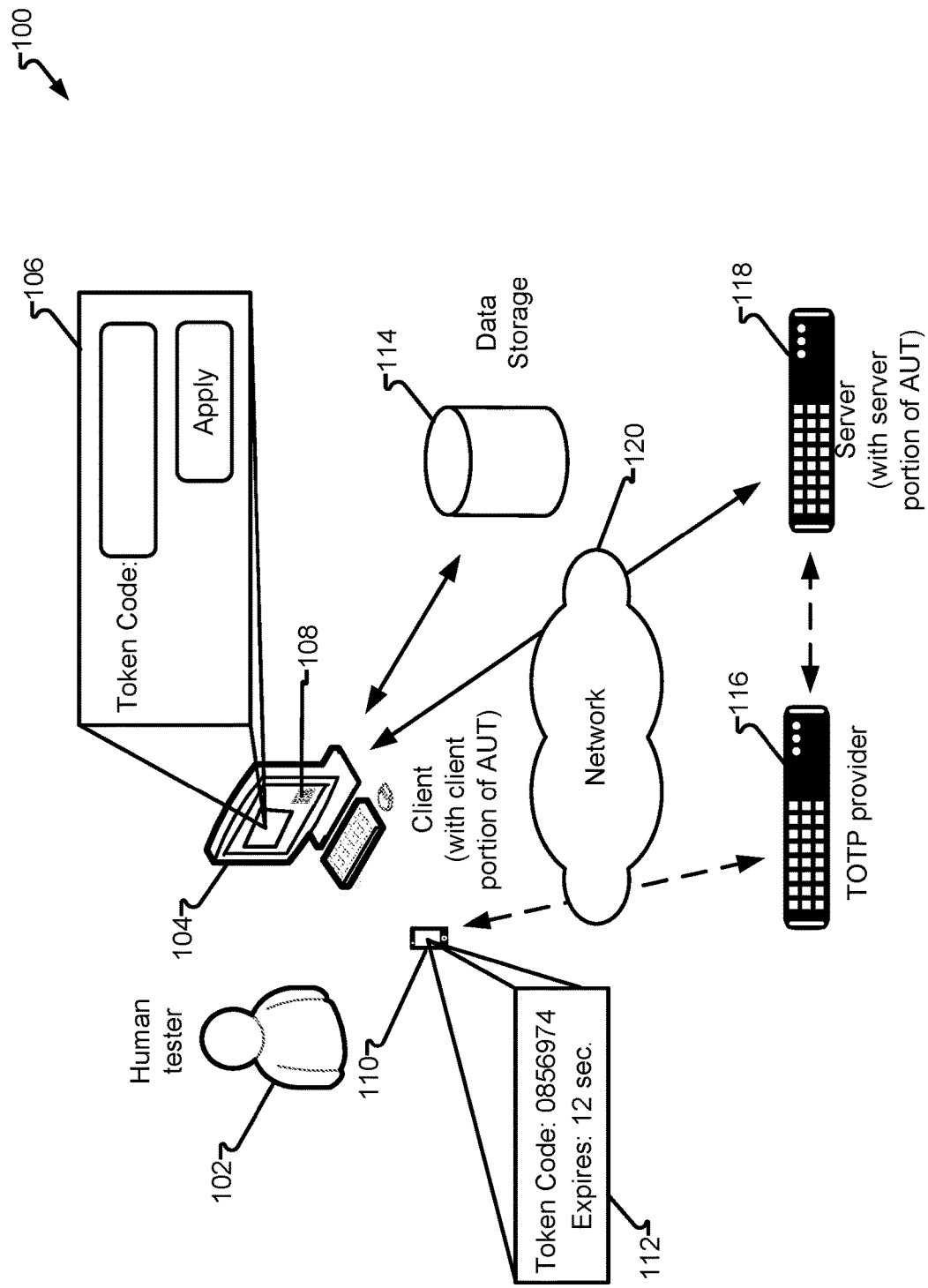
FIG. 1 depicts a system in accordance with embodiments of the present disclosure.

FIG. 1 depicts system 100 in accordance with embodiments of the present disclosure. In one embodiment, human tester 102 operates client 104 comprising an AUT or, at least, a client portion of an AUT, such as a browser interacting with server 118, via network 120, having a server portion of the AUT. In other embodiments the AUT may be a stand-alone application. It should be appreciated that client 104 is a desktop computer, as illustrated, but in other embodiments, client 104 may be a tablet, smart phone, notebook computer, and/or other computing device. Similarly, client 104 may have input devices (e.g., a keyboard, mouse, touchscreen, etc.) and an output device (e.g., a monitor) which may be omitted (i.e., "headless") during subsequent automated testing wherein the output is presented to a memory portion of client 104 and/or other device (e.g., a testing server) and wherein input signals are generated from a processor. During the manual portion of the test performed by human tester 102, a testing application observes the operations provided in order to identify testable features (e.g., graphical elements) and/or one or more tests (e.g., tests applicable to a graphical element), or variations thereof, to perform during subsequent automated testing. The observations may be, or may be used to generate, test scripts. Data storage 114 may store tests scripts, recorded operations, tests, test-generating rules, applications, and/or other data for use by client 104 and/or other device(s).

Previously or independently, off-line device 110 performed an authentication operation with TOTP provider 116 via network 120. The network connection to TOTP provider 116 is not required to be maintained once the authentication operation is complete. Off-line device 110 is offline with respect to client 104; that is, client 104 cannot directly access the token code provided by TOTP token response 112 on off-line device 110. However, off-line device 110 may, or may not, maintain its own network connections to other devices. During the authentication process, a shared secret is used to generate a token that is valid for a limited time, commonly thirty seconds to one minute. After that time the token is regenerated and any previous tokens are no longer valid (i.e., unable to be used for authentication). As long as off-line device 110 has the authentication program configured during the prior authentication process, and has a clock (or has access to a clock, such as periodic access to a cellular network's time signals), off-line device 110 can generate tokens.

During manual testing by human tester 102, TOTP token request prompt 106 is presented on client 104. TOTP token request prompt 106 may be all of, or a portion of, an authentication portion of the AUT, required to access to one or more portions of the AUT. For example, username or account number verification may also be required. Once authenticated, including providing a response to TOTP token request prompt 106, access to a protected portion of the AUT is provided. Client 104, alone or via server 118, evaluates an input to TOTP token request prompt 106 in order to determine if authentication has been successful. For example, server 118 may obtain a key or other data structure in order to evaluate a token code provided to TOTP token request prompt 106 as being authentic or being authentic for a specific user, such as a username previously provided (not shown). Accordingly, human tester 102 reads the token code provided by off-line device 110, which is presenting TOTP token response 112, and provides the token code to TOTP token request prompt 106. If the token code is authentic, for the time that it is valid, authorization to a protected portion of the AUT is granted; otherwise, access is denied.

TOTPs are specific to a user, via a user who previously performed an authentication procedure with TOTP provider 116 and/or a particular authentication application running on a particular device, such as off-line device 110. Human tester 102 operating the AUT on client 104 may have multiple user accounts, such as accounts that allow access to different data or portions of the AUT. Having multiple user accounts, and their associated TOTPs, requires additional steps and/or authentication applications running on one or more off-line devices 110, which further complicates the automation of such tests.

In one embodiment, a management system is provided to serve as a repository for user accounts and shared secrets without relying on an external entity. Additionally, a user interface (UI) automation tool is provided to execute a two-factor TOTP based on authentication steps, to execute synchronization between the UI automation tool and the management system, and to extract and parse shared keys from a common display component having or encoding a shared secret, such as QR code 108.

A user, such as human tester 102 and/or an automated user (i.e., a processor executing an automated test) selects a shared secret, such as QR code 108, at a particular location displayed on client 104. When multiple usernames are available for testing the AUT, corresponding multiple shared secrets (e.g., multiple QR codes 108) are provided for selection corresponding to the username. A shared secret manager maintains the shared secret-username pairs utilized by the authenticator. A one-time password (OTP) is generated in accordance with the particular shared secret-username pair for automated entry as a portion of the authentication process required by the AUT. The OTP may be time limited (i.e., a TOTP).

Figure 2:
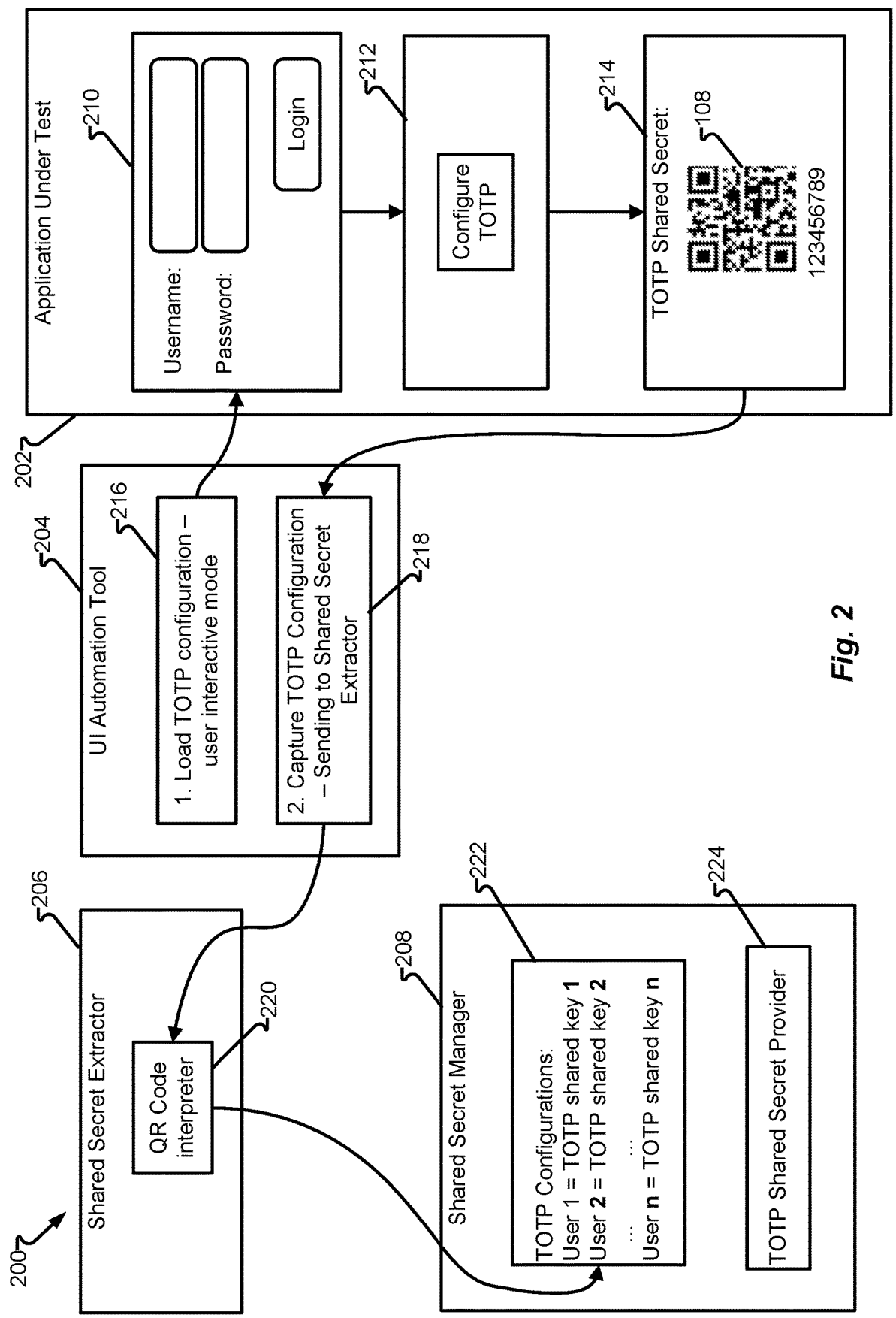
FIG. 2 depicts a process flow in accordance with embodiments of the present disclosure.

FIG. 2 depicts process flow 200 in accordance with embodiments of the present disclosure. In one embodiment, process flow 200 is performed by human tester 102 to provide a username, password, and identification of a source on client 104 having the shared secret. As a result, a shared key (the value encoded by QR code 108) is added to a record for that particular username and is authenticated with a TOTP provider. In another embodiment, AUT 202 is executed on a computing device, such as client 104 operated by human tester 102. The execution of any of one or more of UI automation tool 204, shared secret extractor 206, and shared secret manager 208 may be on client 104 or one or more devices in communication with client 104 and/or an intervening component. UI automation tool 204 is accessed by human tester 102 to navigate UI automation tool 204 to username and password prompt 210 in operation 216. Human tester 102 navigates UI automation tool 204 to configure TOTP 212 for configuration and, using a mouse pointer or other input device, identifies graphical element 214 having QR code 108 (or another element comprising the shared secret).

Having QR code 108 identified to UI automation tool 204, UI automation tool 204 captures the TOTP configuration in operation 218 and provides QR code 108 to QR code interpreter 220 of shared secret extractor 206. Shared secret extractor 206 adds the new TOTP shared secret record and corresponding username to username specific shared keys 222. Shared secret manager 208 accesses TOTP shared secret provider 224 to establish authentication for the record(s) of username specific shared keys 222.

Figure 3:
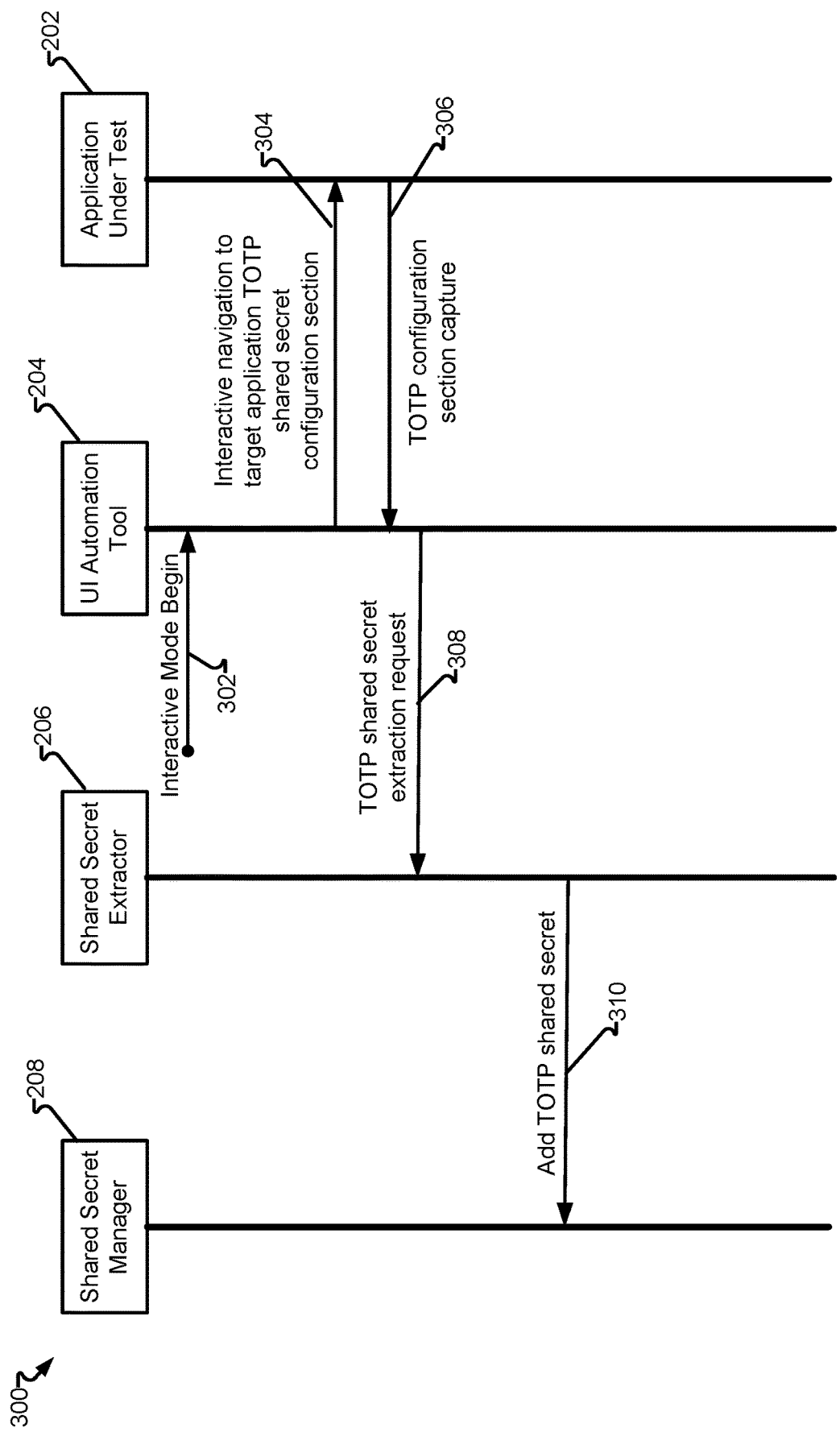
FIG. 3 depicts a data flow in accordance with embodiments of the present disclosure.

FIG. 3 depicts data flow 300 in accordance with embodiments of the present disclosure. In one embodiment, data flow 300 begins with step 302 initiating an interactive mode with UI automation tool 204, such as by human tester 102 operating client 104. In step 304, UI automation tool 204, alone or in conjunction with inputs provided by human tester 102 via an input device, navigates to the TOTP shared secret configuration section (e.g., configure TOTP 212) of AUT 202. In step 306, the TOTP configuration section is captured by UI automation tool 204, such as comprising QR code 108. UI automation tool 204 provides QR code 108 to shared secret extractor 206 in step 308. Shared secret extractor 206 extracts the shared secret, such as from decoding QR code 108, to be added to a shared secret record by shared secret manager 208 in step 310.

Figure 4:
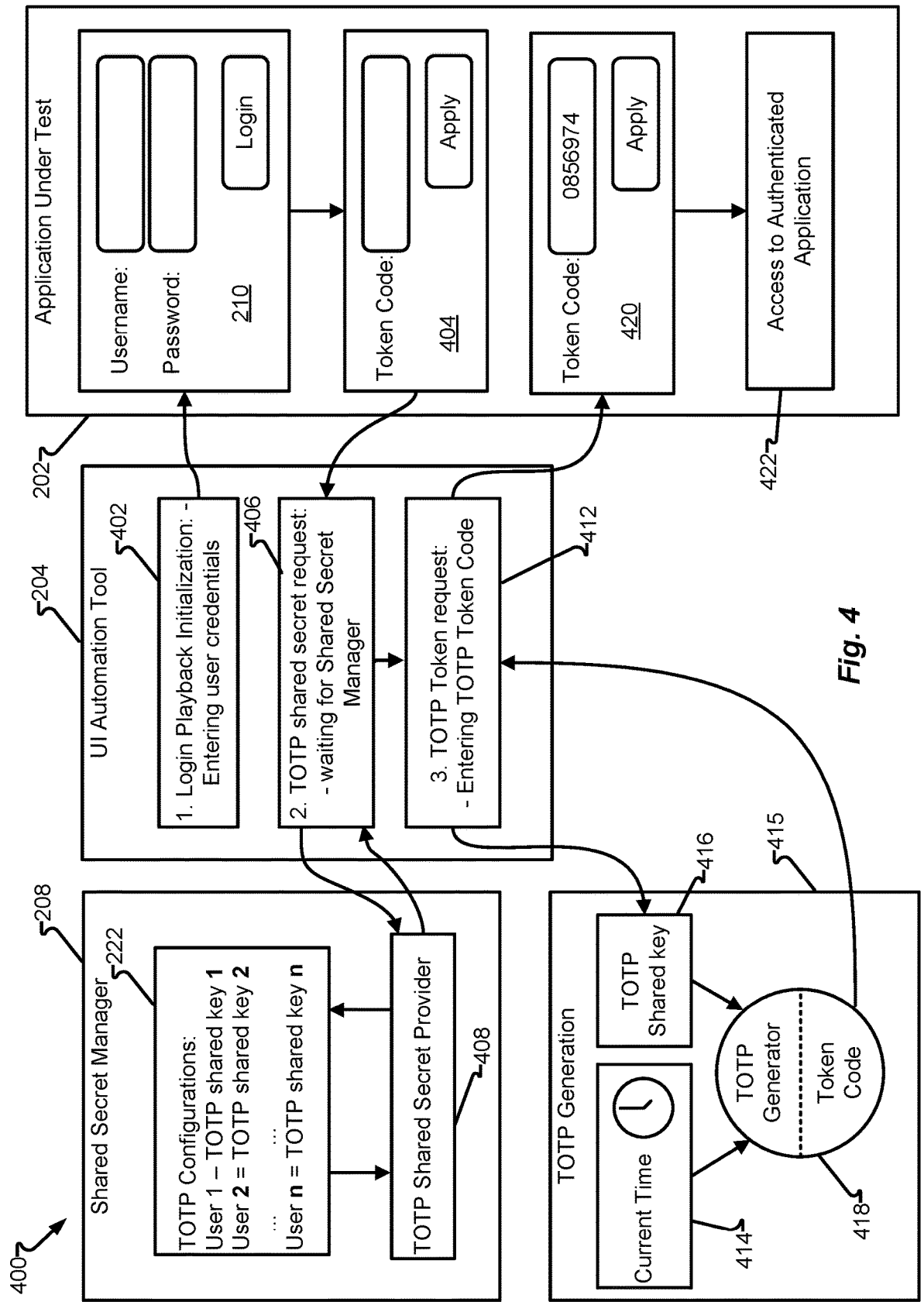
FIG. 4 depicts a process flow in accordance with embodiments of the present disclosure.

FIG. 4 depicts process flow 400 in accordance with embodiments of the present disclosure. One embodiment illustrates an automated test performing a test on AUT 202. UI automation tool 204 executes login playback operation 402 as a portion of the application login sequence to access protected portions of AUT 202. In response to entering a valid username and password into username and password prompt 210, token code prompt 404 is presented.

In response to token code prompt 404, UI automation tool 204 requests the shared secret from shared secret manager 208 in operation 406, which requests the shared secret from shared secret provider 408, which in turn accesses the shared secret key associated with the particular user (i.e., the username provided to the username portion of username and password prompt 210) from username specific shared keys 222. With the TOTP shared key, TOTP shared secret provider 408 provides the shared secret back to UI automation tool 204. UI automation tool 204 then issues TOTP token request in operation 412 to TOTP generation 415. TOTP generation 415 utilizes current time 414 and the TOTP shared key 416 obtained from UI automation tool 204 to cause TOTP generator 418 to generate a TOTP token code. With the TOTP token code, UI automation tool 204 populates token code prompt 404 to become token code populated 420 and gain access to the protected portions of AUT 202 in operation 422.

Figure 5:
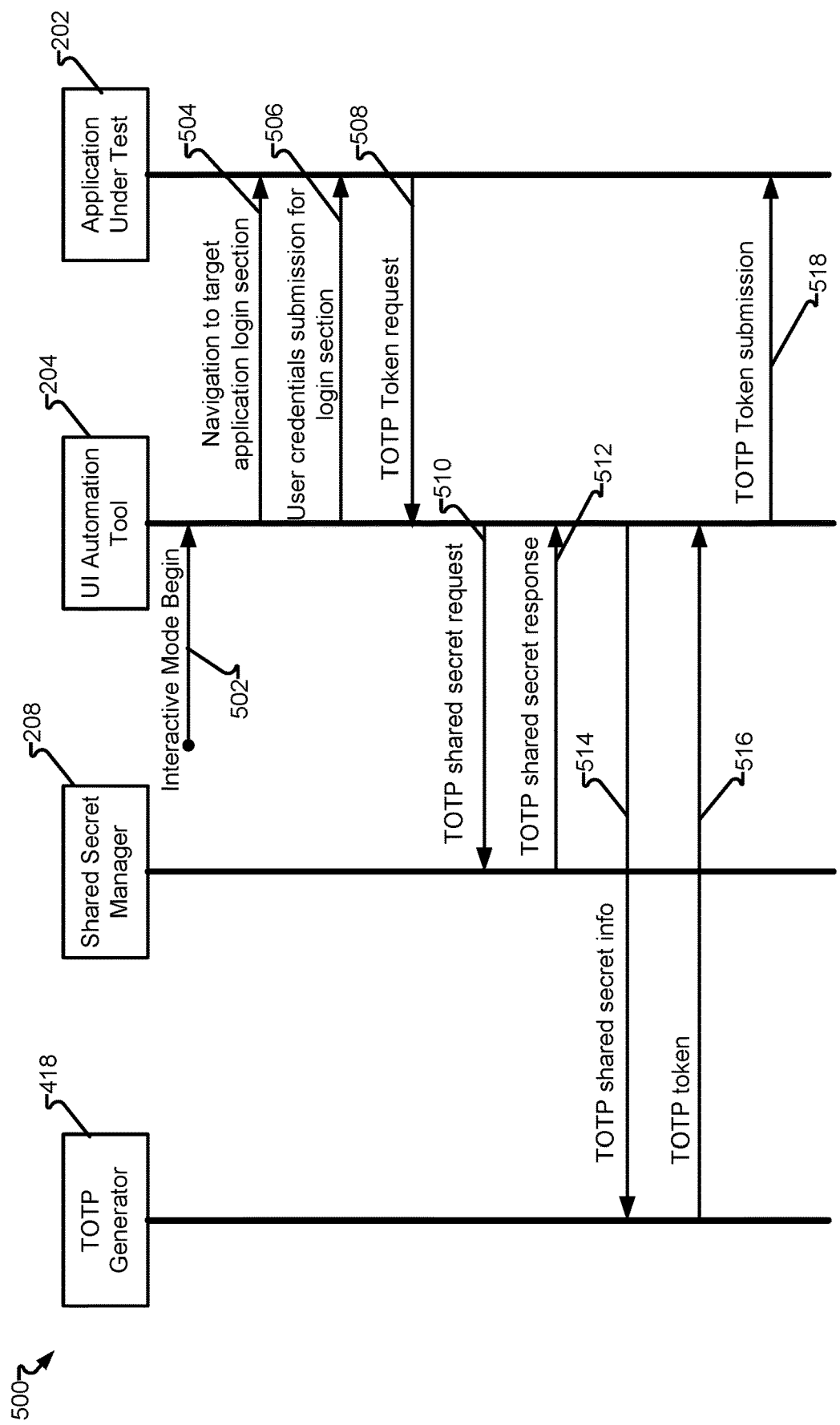
FIG. 5 depicts a data flow in accordance with embodiments of the present disclosure.

FIG. 5 depicts data flow 500 in accordance with embodiments of the present disclosure. In one embodiment, data flow 500 begins when interactive mode is initiated in step 502 on UI automation tool 204. UI automation tool 204 then navigates to the login section of AUT 202 in step 504 and provides user credentials in step 506. In response to a valid username and login, AUT 202 requests a TOTP login token in step 508, which is detected by UI automation tool 204.

UI automation tool 204 requests the TOTP shared secret from shared secret manager 208 in step 510 and receives the shared secret in step 512. In response, UI automation tool 204 provides the shared secret to TOTP generator 418 in step 514 and, in response, receives the TOTP token in step 516. UI automation tool 204 then provides the TOTP token to AUT 202 in step 518.

Figure 6:
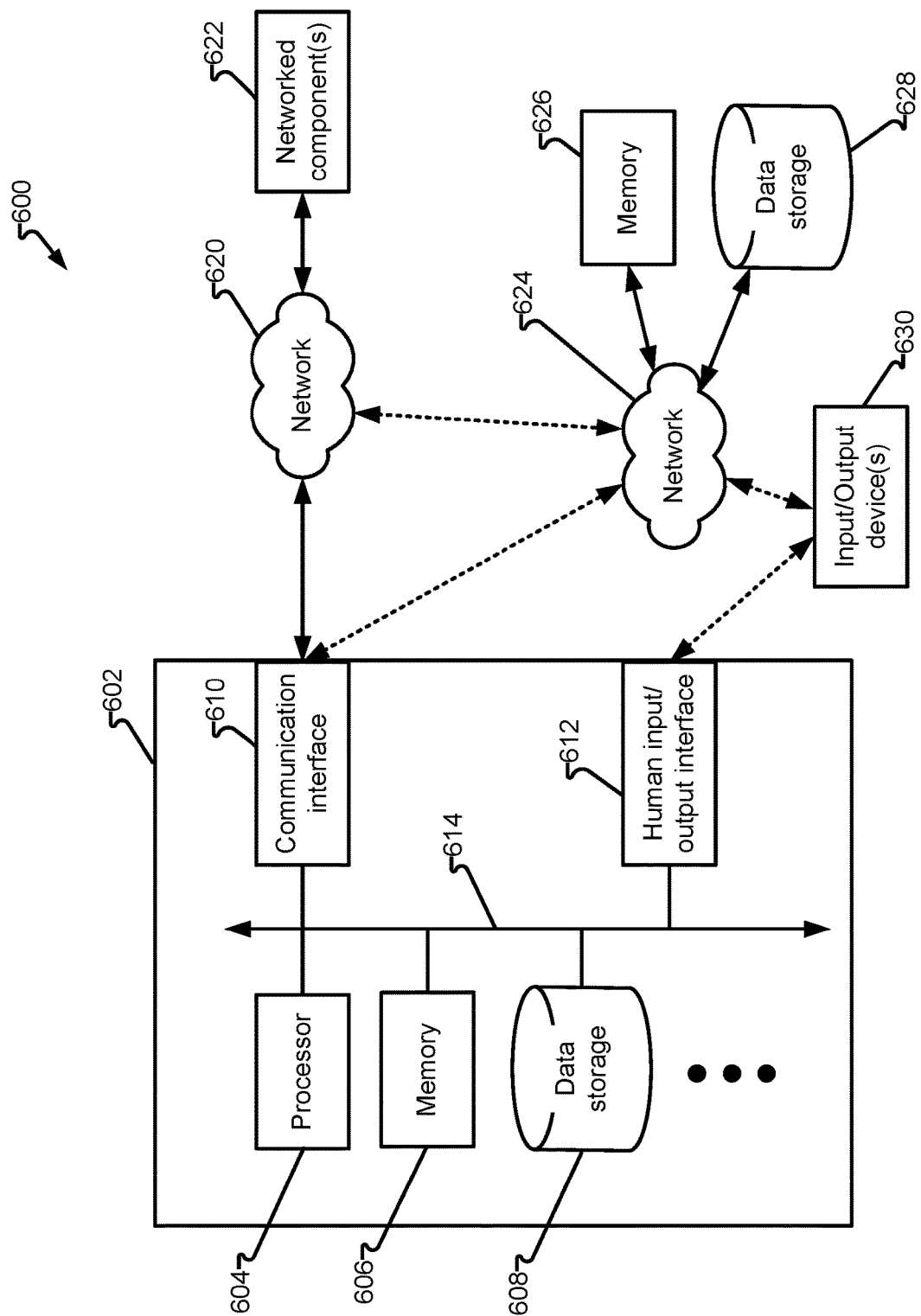
FIG. 6 depicts a system in accordance with embodiments of the present disclosure.

FIG. 6 depicts device 602 in system 600 in accordance with embodiments of the present disclosure. In one embodiment, one or more of client 104, server 118, TOTP provider 116, or off-line device 110 may be embodied, in whole or in part, as device 602 comprising various components and connections to other components and/or systems. The components are variously embodied and may comprise processor 604. The term "processor," as used herein, refers exclusively to electronic hardware components comprising electrical circuitry with connections (e.g., pin-outs) to convey encoded electrical signals to and from the electrical circuitry. Processor 604 may comprise programmable logic functionality, such as determined, at least in part, from accessing machine-readable instructions maintained in a non-transitory data storage, which may be embodied as circuitry, on-chip read-only memory, computer memory 606, data storage 608, etc., that cause the processor 604 to perform the steps of the instructions. Processor 604 may be further embodied as a single electronic microprocessor or multiprocessor device (e.g., multicore) having electrical circuitry therein which may further comprise a control unit(s), input/output unit(s), arithmetic logic unit(s), register(s), primary memory, and/or other components that access information (e.g., data, instructions, etc.), such as received via bus 614, executes instructions, and outputs data, again such as via bus 614. In other embodiments, processor 604 may comprise a shared processing device that may be utilized by other processes and/or process owners, such as in a processing array within a system (e.g., blade, multi-processor board, etc.) or distributed processing system (e.g., "cloud", farm, etc.). It should be appreciated that processor 604 is a non-transitory computing device (e.g., electronic machine comprising circuitry and connections to communicate with other components and devices). Processor 604 may operate a virtual processor, such as to process machine instructions not native to the processor (e.g., translate the VAX operating system and VAX machine instruction code set into Intel® 9xx chipset code to enable VAX-specific applications to execute on a virtual VAX processor). However, as those of ordinary skill understand, such virtual processors are applications executed by hardware, more specifically, the underlying electrical circuitry and other hardware of the processor (e.g., processor 604). Processor 604 may be executed by virtual processors, such as when applications (i.e., Pod) are orchestrated by Kubernetes. Virtual processors enable an application to be presented with what appears to be a static and/or dedicated processor executing the instructions of the application, while underlying non-virtual processor(s) are executing the instructions and may be dynamic and/or split among a number of processors.

In addition to the components of processor 604, device 602 may utilize computer memory 606 and/or data storage 608 for the storage of accessible data, such as instructions, values, etc. Communication interface 610 facilitates communication with components, such as processor 604 via bus 614 with components not accessible via bus 614. Communication interface 610 may be embodied as a network port, card, cable, or other configured hardware device. Additionally or alternatively, human input/output interface 612 connects to one or more interface components to receive and/or present information (e.g., instructions, data, values, etc.) to and/or from a human and/or electronic device. Examples of input/output devices 630 that may be connected to input/output interface include, but are not limited to, keyboard, mouse, trackball, printers, displays, sensor, switch, relay, speaker, microphone, still and/or video camera, etc. In another embodiment, communication interface 610 may comprise, or be comprised by, human input/output interface 612. Communication interface 610 may be configured to communicate directly with a networked component or configured to utilize one or more networks, such as network 620 and/or network 624.

Network 120 may be embodied, in whole or in part, as network 620. Network 620 may be a wired network (e.g., Ethernet), wireless (e.g., WiFi, Bluetooth, cellular, etc.) network, or combination thereof and enable device 602 to communicate with networked component(s) 622. In other embodiments, network 620 may be embodied, in whole or in part, as a telephony network (e.g., public switched telephone network (PSTN), private branch exchange (PBX), cellular telephony network, etc.).

Additionally or alternatively, one or more other networks may be utilized. For example, network 624 may represent a second network, which may facilitate communication with components utilized by device 602. For example, network 624 may be an internal network to a business entity or other organization, whereby components are trusted (or at least more so) than networked components 622, which may be connected to network 620 comprising a public network (e.g., Internet) that may not be as trusted.

Components attached to network 624 may include computer memory 626, data storage 628, input/output device(s) 630, and/or other components that may be accessible to processor 604. For example, computer memory 626 and/or data storage 628 may supplement or supplant computer memory 606 and/or data storage 608 entirely or for a particular task or purpose. As another example, computer memory 626 and/or data storage 628 may be an external data repository (e.g., server farm, array, "cloud," etc.) and enable device 602, and/or other devices, to access data thereon. Similarly, input/output device(s) 630 may be accessed by processor 604 via human input/output interface 612 and/or via communication interface 610 either directly, via network 624, via network 620 alone (not shown), or via networks 624 and 620. Each of computer memory 606, data storage 608, computer memory 626, data storage 628 comprise a non-transitory data storage comprising a data storage device.

It should be appreciated that computer readable data may be sent, received, stored, processed, and presented by a variety of components. It should also be appreciated that components illustrated may control other components, whether illustrated herein or otherwise. For example, one input/output device 630 may be a router, a switch, a port, or other communication component such that a particular output of processor 604 enables (or disables) input/output device 630, which may be associated with network 620 and/or network 624, to allow (or disallow) communications between two or more nodes on network 620 and/or network 624. One of ordinary skill in the art will appreciate that other communication equipment may be utilized, in addition or as an alternative, to those described herein without departing from the scope of the embodiments.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components by, in one or more embodiments, voltages in memory circuits, configuration of switching circuits, and/or by selective use of particular logic gate circuits. Additionally or alternatively, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessors may be integrated into a single processing appliance (e.g., computer, server, blade, etc.) or located entirely, or in part, in a discrete component and connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMS, EPROMS, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, a first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core i5-3570K 22nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARM926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein as provided by one or more processing components.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A computer-implemented method of testing an application under test (AUT), comprising:
    executing the AUT, comprising an authentication challenge to access a protected portion of the AUT and wherein the authentication challenge requires a token code corresponding to a time-based one-time password (TOTP);
    executing a test script comprising a number of tests to test the AUT;
    in response to encountering the authentication challenge, requesting the token code to satisfy the authentication challenge, the requesting comprising requesting a shared secret from a shared secret manager;
    upon receiving the shared secret from the shared secret manager, providing the shared secret to a TOTP token generator;
    populating a response field associated with the authentication challenge with the token code received from the TOTP token generator; and
    executing the test script comprising at least one test of the number of tests to test the protected portion of the AUT.

2. The computer-implemented method of claim 1, wherein:
    requesting the shared secret further comprises requesting the shared secret corresponding to a username provided to the AUT; and
    receiving the shared secret from the shared secret manager further comprises receiving the shared secret corresponding to the username.

3. The computer-implemented method of claim 1, wherein:
    providing the shared secret to the TOTP token generator and receiving the token code therefrom further comprises generating the TOTP by the TOTP token generator; and wherein the computer-implemented method further comprises providing at least one of the token code or a key derived from the token code to the AUT as a portion of the authentication challenge.

4. The computer-implemented method of claim 1, wherein prior to requesting the shared secret from the shared secret manager, providing the shared secret to the shared secret manager comprises accessing the shared secret maintained on a test device executing and providing, by the test device, the shared secret to the shared secret manager.

5. The computer-implemented method of claim 4, wherein the shared secret corresponds to a username.

6. The computer-implemented method of claim 4, wherein the shared secret maintained on the test device comprises a graphical element having the shared secret encoded therein.

7. The computer-implemented method of claim 6, wherein the graphical element comprises a quick response code (QR code).

8. The computer-implemented method of claim 6, wherein the graphical element is at a location presented on a display generated by the test device and wherein the location is determined from a previously recorded user action selecting the graphical element.

9. A system for testing an application under test (AUT), comprising:
a processor coupled to a computer memory and having instructions to cause the processor to perform:
executing the AUT, comprising an authentication challenge to access a protected portion of the AUT and wherein the authentication challenge requires a token code corresponding to a time-based one-time password (TOTP);
executing a test script comprising a number of tests to test the AUT;
in response to encountering the authentication challenge, requesting the token code to satisfy the authentication challenge, the requesting comprising requesting a shared secret from a shared secret manager;
upon receiving the shared secret from the shared secret manager, providing the shared secret to a TOTP token generator;
populating a response field associated with the authentication challenge with the token code received from the TOTP token generator; and
executing the test script comprising at least one test of the number of tests to test the protected portion of the AUT.

10. The system of claim 9, wherein:
requesting the shared secret further comprises requesting the shared secret corresponding to a username provided to the AUT; and
receiving the shared secret from the shared secret manager further comprises receiving the shared secret corresponding to the username.

11. The system of claim 9, wherein:
providing the shared secret to the TOTP token generator and receiving the token code therefrom further comprises generating the token code by the TOTP token generator; and
further comprising providing at least one of the token code or a key derived from the token code to the AUT as a portion of the authentication challenge.

12. The system of claim 9, wherein prior to requesting the shared secret from the shared secret manager, providing the shared secret to the shared secret manager comprises accessing the shared secret maintained on a test device executing and providing, by the test device, the shared secret to the shared secret manager.

13. The system of claim 12, wherein the shared secret is further associated with a username.

14. The system of claim 12, wherein the shared secret maintained on the test device comprises a graphical element having the shared secret encoded therein.

15. The system of claim 14, wherein the graphical element comprises a quick response code (QR code).

16. The system of claim 14, wherein the graphical element is at a location of a display generated by the test device and wherein the location is determined from a previously recorded user action selecting the graphical element.

17. A system for testing an application under test (AUT), comprising:
a processor coupled to a computer memory and having instructions to cause the processor to perform:
executing the AUT, comprising an authentication challenge to access a protected portion of the AUT and wherein the authentication challenge requires a token code corresponding to a time-based one-time password (TOTP);
in response to encountering the authentication challenge, requesting the token code to satisfy the authentication challenge, the requesting comprising requesting a shared secret wherein the shared secret is selected via an input device input corresponding to a graphical element having the shared secret encoded therein;
providing the shared secret to a shared secret extractor for populating a record of shared secrets;
performing one or more tests on the AUT; and
performing an automated test on the AUT, wherein the performing comprises:
upon receiving the shared secret from a shared secret manager, providing the shared secret to a TOTP token generator;
populating a response field associated with the authentication challenge with the token code received from the TOTP token generator; and
executing a test script comprising at least one test of a number of tests to test the protected portion of the AUT.

18. The system of claim 17, wherein the graphical element comprises a quick response code (QR code).

19. The system of claim 17, wherein providing the shared secret to the shared secret extractor, for populating the record of shared secrets, comprises the shared secret corresponding to a username provided to the AUT.

20. The system of claim 19, wherein the token code corresponds to the username.

* * * * *